United States Patent
Bartlett

[15] 3,700,207
[45] Oct. 24, 1972

[54] WASHER REPLACEMENT ASSEMBLY FOR FAUCET VALVES

[72] Inventor: Joseph E. Bartlett, 215 South Parker Avenue, Highway 7, Olathe, Kans. 66061

[22] Filed: July 23, 1970

[21] Appl. No.: 57,691

[52] U.S. Cl..................251/88, 16/42 R, 251/368
[51] Int. Cl..............................F16k 25/00
[58] Field of Search......16/42 R; 151/37; 251/85, 86, 251/88, 357, 368; 24/1 P, 90 PR

[56] References Cited

UNITED STATES PATENTS

| | | | |
|---|---|---|---|
| 2,192,322 | 3/1940 | Mitchell | 151/37 UX |
| 2,709,470 | 5/1955 | Knohl | 151/37 |
| 2,952,439 | 9/1960 | Koons | 251/357 |
| 3,385,560 | 5/1968 | Hare | 251/88 |
| 3,472,481 | 10/1969 | Spies | 251/86 X |
| 2,452,354 | 10/1948 | Bucknell et al. | 251/85 |
| 2,850,759 | 9/1958 | Petri | 16/42 R |
| 3,137,476 | 6/1964 | Rotheraine et al. | 251/357 |
| 3,275,287 | 9/1966 | Bartlett | 251/88 |
| 3,411,744 | 11/1968 | Prather | 251/88 |

FOREIGN PATENTS OR APPLICATIONS

| | | | |
|---|---|---|---|
| 1,120,748 | 4/1956 | France | 251/88 |
| 491,245 | 3/1953 | Canada | 251/357 |

*Primary Examiner*—Henry T. Klinksiek
*Attorney*—Scofield, Kokjer, Scofield & Lowe

[57] ABSTRACT

A nonmetallic washer having a resilient main body and a bifurcated variable thickness shank integral therewith. A frictionless bearing is located at the juncture between the main body and shank, the shank being insertable into the central bore of the faucet valve with the bearing thus between the washer and end of the stem. An auxiliary, resilient spacer held within the slot of the shank provides adaptation of the washer to various size stem bores.

7 Claims, 9 Drawing Figures

PATENTED OCT 24 1972  3,700,207

INVENTOR.
Joseph E. Bartlett
BY
ATTORNEYS 3,700,207

WASHER REPLACEMENT ASSEMBLY FOR FAUCET VALVES

BACKGROUND AND SUMMARY OF THE INVENTION

This invention relates to an improved washer replacement for repairing valve stems found in ordinary water faucets.

At some time, most everyone has experienced the dismay occasioned by a leaking or dripping water faucet. A frequent cause of this exasperating situation is a deteriorated washer on the valve stem which no longer provides a satisfactory seal with the valve seat. A logical remedy is to replace the washer.

Many varieties of washer replacement parts are commercially available. A rather typical replacement assembly includes a circular washer fabricated from rubber or a synthetic material which is mounted on the valve stem by a metal screw threaded into the central bore of the stem. However, there are some inherent deficiencies in the typical replacement assembly.

Since the head of the shank normally projects from the washer and thereby contacts the water, the screw should be fabricated from a corrosion resistance metal in order to obtain a reasonable service life. However, this increases the expense of manufacturing the washer replacement and is ultimately passed on to the consumer.

As to the service life of the washer itself, deterioration and wear of the washer are caused when it rotates against the valve seat as the faucet is turned on or off. To correct this action, it would be most beneficial if the washer swiveled on the valve stem whereby rotation against the valve seat could be effectively eliminated. Swivel washers are known, but they are relatively complex and expensive to manufacture.

There is a need in this field for an improved low cost washer replacement assembly which cures the infirmities found in the commercially available and prior patent art assemblies. The primary object of this invention is to provide an improved washer replacement assembly meeting this need.

More specifically, an object of this invention is to provide a washer replacement assembly fabricated from nonmetallic, corrosion resistance material to achieve an extended service life. An additional feature, cumulatively aiding to achieve an extended service life is the swivel action of the washer against the valve seat, which eliminates the abrading action resulting in deterioration should the washer be permitted to rotate against the valve seat.

Another object of the invention is to provide a washer replacement assembly adaptable to fit a variety of sizes for the central bore of the valve stem irrespective of the condition of the threads therein.

An additional object of the invention is to provide a washer replacement assembly which is extremely easy to install on a valve stem without special tools. The general installation procedure requires only that the shank of the assembly be pushed axially into the central bore of the stem.

A further object of the invention is to provide a washer replacement assembly having the beneficial features described and, at the same time, being inexpensive to manufacture.

Other and further objects, together with the features of novelty appurtenant thereto, will appear in the course of the following description.

DESCRIPTION OF THE DRAWING

In the accompanying drawing which forms a part of the specification and is to be read in conjunction therewith, and in which like reference numerals are employed to indicate like parts in the various views:

Referring more particularly to the drawing, FIG. 1 illustrates a typical water faucet having a body portion 10 which is connected through a female fitting 11 to a water pipe 12. Within the body portion 10, an inlet chamber 13 leads from the pipe 12 to an outlet chamber 14 which discharges through the spout 15 of the faucet. The chambers 13 and 14 are separated by a partition 16 having an open throat 17 therethrough. The upper lip of the partition 16 around the throat 17 provides a valve seat 18.

Figure 1:
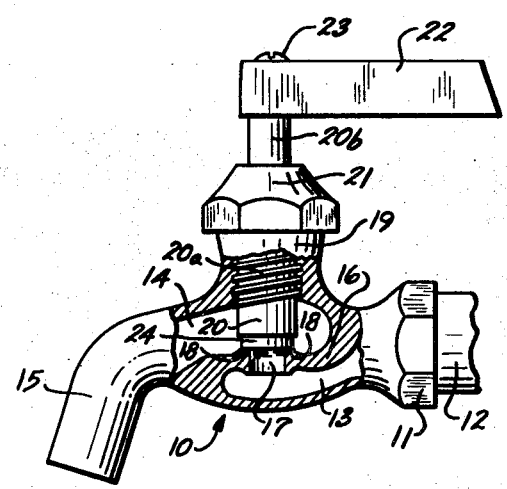
FIG. 1 is a side elevational view of a typical water faucet with the central portion thereof broken away to expose a valve stem fitted with a washer replacement assembly constructed in accordance with a preferred embodiment of the invention.

Within the neck 19 of the faucet is disposed a valve stem 20 having threads 20a and terminating at the upper end in a reduced extension 20b. A reduction cap 21 is threadably received on the upper end of the neck 19 and tapers inwardly therefrom to the extension 20b thus providing a sealed closure for the faucet but permitting the valve stem 20b to be rotatably turned therein. The upper end of the extension 20b has a toothed portion (not shown) which is fitted with a handle 22 secured thereto by a screw 23.

Figure 4:
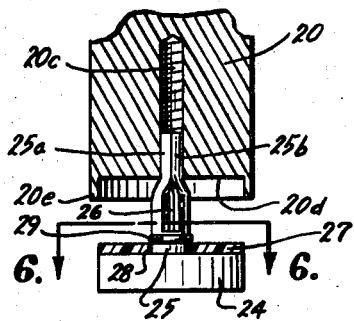
FIG. 4 is a side elevational view of the replacement assembly in initial engagement with a valve stem shown in section and having a central bore smaller than the shank of the assembly.
Figure 5:
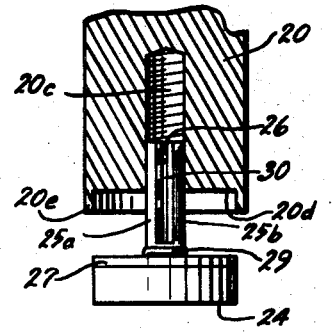
FIG. 5 is a side elevational view of a replacement assembly illustrating a second embodiment of the invention in initial engagement with a valve stem shown in section and having a central bore therein substantially the same size as the shank of the assembly.
Figure 3:
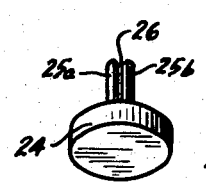
FIG. 3 is an exploded perspective view of the valve stem and replacement assembly as shown in FIG. 2.

As best understood with reference to FIGS. 3 through 5, the lower portion of the stem 20 has a threaded bore 20c extending upwardly from the lower face 20d. A rim flange 20e is circumferentially integral with the lower face 20d and projects downwardly therefrom. My prior U.S. Pat. No. 3,275,287, issued Sept. 27, 1966, entitled "Components For Faucet Valve Washer Replacement" discloses a washer replacement assembly for repairing a valve stem in the event the rim flange 20e is broken or otherwise damaged.

It should be understood that the stem 20 as viewed in FIG. 3 depicts an ordinary valve stem with the original washer and its retention screw (neither shown) having been removed.

Turning now to the replacement washer assembly, the lower portion thereof or washer main body 24 is in the form of solid, right circular cylinder having a diameter substantially equal to, but slightly less than, the inside diameter of the rim flange 20e and further having a height substantially less than the diameter of the cylinder. Centrally projecting from the upper face of the washer 24 and integral therewith is an unthreaded shank 25 having a smooth cylindrical outer surface. The washer 24 and its shank 25 are preferably fabricated by molding or machining a thermoplastic urethane polymer, sold under the trademark TEXIN, which has the beneficial qualities of resilient deformation and resistance to deterioration necessary to the present invention.

Figure 6:
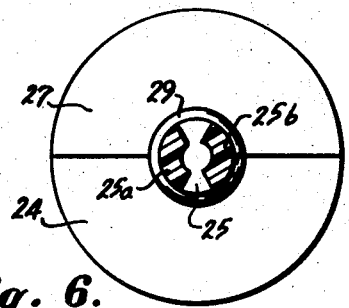
FIG. 6 is an enlarged plan view along line 6—6 of FIG. 4 in the direction of the arrows.

An elongate slot 26 extends from the upper end of the shank 25 and substantially throughout the length thereof to provide a bifurcated structure having parallel legs 25a and 25b. As viewed in cross section in FIG. 6, each leg 25a and 25b is in the form of a ring section with each section cut on radii of the ring. In other words, each section can be visualized as the region between two concentric circles with the terminal ends of the section cut on radii of the center of the circles to provide a ring section of greater area than the area removed.

Disposed on the shank 25 adjacent the confronting surface of the washer 24 is a circular wafer bearing having an outside diameter substantially the same as the diameter of the washer 24. The wafer bearing 27 should be fabricated from a material having low friction properties. Satisfactory results are achieved when the wafer bearing 27 engaging the upper face of the washer 24 is fabricated from a polytetrafluoroethylene polymer, sold under the trademark TEFLON. A central opening 28 through the wafer bearing 27 is of substantially the same outside diameter as the shank 25.

Integral with the shank 25 and slightly above the upper surface of the washer 24 is a circumferential ridge 29 having a diameter slightly larger than the central opening 28 through the wafer bearing 27. The ridge 29 serves to lock the bearing 27 to the shank when the bearing 27 is slipped over the shank 25 and pressed to engagement with the washer 24.

In order to fully appreciate the modifications later to be discussed, an understanding of the typical procedure for replacing the washer assembly is helpful. First, the screw 23 is removed from the extension 20b, thus permitting the handle 22 to be slipped from the end of the extension 20b. The cap 21 is then unthreaded from the neck 19 and removed over the extension 20b. At this point, the handle 21 may again be slipped onto the toothed portion of the extension 20b to provide leverage for turning and removing the stem 20 from the neck 19. With the valve stem 20 thus exposed, the retention screw or other holding means can be removed from the threaded bore 20c and the defective washer can then be discarded.

With the wafer bearing 27 snap-pressed to the washer 24 and retained thereto by the ridge 29, the general procedure is to push the legs 25a and 25b of the shank 25 upwardly into the bore 20c. However, before so doing, the nature and size of the threaded recess 20c is examined to determine which following modification of the instant invention may be required.

As viewed in FIG. 4, the washer replacement as previously described illustrates that the legs 25a and 25b are sufficiently flexible to be pressed together and inserted in a bore 20c of smaller diameter than the apparent outside diameter of the shank 25. Due to the deformable nature of the legs 25a and 25b and the ring section shape thereof, the terminal ends of each ring section are pressed together within the bore 20c so that the outer surface of the shank 25 takes on a substantially circular shape in section. Since this action slightly stretches the outer surface of the shank 25, stress forces resisting the deformation tend to urge the shank 25 to return to its original shape and therefore, supply radial forces throughout the entire outer surface of the shank 25 to securely grip the walls of the bore 20c.

Figure 8:
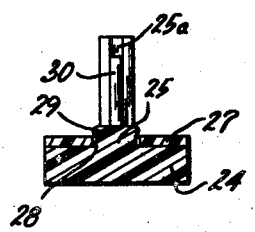
FIG. 8 is a sectional side view of a replacement assembly illustrating the second embodiment of the invention as shown in FIG. 5.

FIGS. 5 and 8 illustrate a second embodiment of the invention. FIG. 5 shows the initial installation of the washer replacement on a valve stem 20 in which the threaded bore 20c is closer to but still slightly less than the diameter of the shank 25. In this situation, it is necessary to employ an expander plug 30 which is in the form of a solid, right circular cylinder being substantially the same diameter as the inside diameter between the legs 25a and 25b. The plug 30 is inserted lengthwise in the slot 26 to provide additional rigidity to the legs 25a and 25b and thereby hold them apart to be gripped by the threads in the bore 20c. The plug 30 is preferably fabricated from a resilient material such as rubber, neoprene, or urethane polymer.

Figure 9:
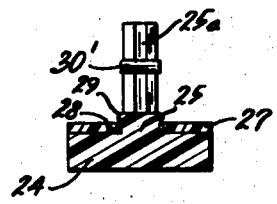
FIG. 9 is a sectional side view of a replacement assembly illustrating yet a fourth embodiment of the invention.

Should the bore 20c be slightly larger, or the threads therein be so worn and corroded as to provide little gripping power to the shank 25, it may be necessary to employ a third embodiment of this invention as shown in FIG. 9. Here, the expander plug 30 is placed crosswise in the slot 26 and may be trimmed to an appropriate length. An expander plug so trimmed is designated by the numeral 30' in FIG. 9. With this arrangement, the legs 25a and 25b are spread apart in order that the effective outside diameter of the shank 25 is increased to achieve a wedging effect when pushed into the oversize bore 20c.

Figure 2:
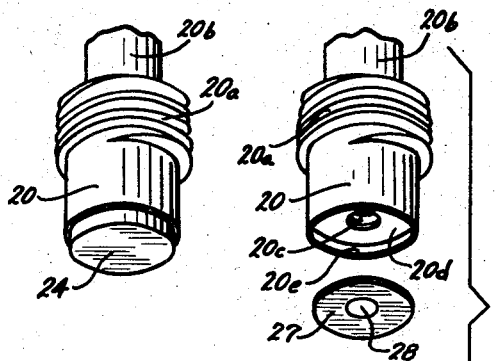
FIG. 2 is an enlarged perspective view of the lower end of a valve stem fitted with the washer replacement assembly.

When the washer replacement assembly is fully installed, as shown in FIG. 2, the upper surface of the bearing 27 engages the lower face 20d of the stem 20. Thereafter, the faucet is reassembled by reversing the normal disassembly procedure as previously mentioned. In the closed position, the lower face of the washer 24 is sealed against the valve seat 18 to prevent water from flowing from the inlet chamber 13 through the throat 17 to the outlet chamber 14.

Figure 7:
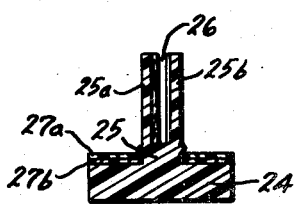
FIG. 7 is a sectional side view of a replacement assembly illustrating a third embodiment of the invention.

As previously mentioned, valve stems are made in several standard sizes, just as the central bore 20c is found in a variety of standard sizes. In this connection, FIG. 7 illustrates a final embodiment of this invention adapted for color coding by size the washer replacement assemblies. Since the availability of colored polytetrafluoroethylene polymers is somewhat limited, it is beneficial to provide two wafer bearings 27a and 27b, one of which is fabricated from a polytetrafluoroethylene polymer and the other of which is fabricated from a colored thermoplastic urethane polymer to represent the size of the washer replacement. When this assembly is installed on the valve stem, the polytetrafluoroethylene bearing still provides the beneficial swivel action for the washer that is accomplished by use with a single wafer bearing.

From the foregoing description and drawing, one can easily appreciate that this washer assembly entirely eliminates the use of metal in its construction and, therefore, effectively eliminates the corrosion problems associated with metallic parts. In addition, the quick installation with a push fit and swivel action of the washer to minimize wear against the valve seat collectively aids to provide a washer replacement assembly capable of trouble-free operation for a substantial length of service.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A washer replacement assembly for repairing a valve stem having an internally threaded central bore therein, said assembly comprising:
   a resilient, nonmetallic washer of solid cylindrical shape; and
   a resiliently deformable, nonmetallic shank integral with said washer and centrally projecting therefrom, said shank having an unthreaded, cylindrical surface and a longitudinal slot substantially bifurcating the length thereof to provide two legs to be received within said central bore of said valve stem to retain said washer to said stem,
   in section, each of said legs being in the form of a ring section and pressable together for insertion in said central bore should the diameter thereof be smaller than the diameter of said shank.

2. The assembly as in claim 1 including at least one cylindrical wafer bearing having a circular opening therein of substantially the same diameter as said shank, said bearing being disposed on said shank to mate with said washer.

3. The assembly as in claim 2, wherein said shank includes a circumferential ridge slightly above said washer, said ridge being of slightly greater diameter than said cylindrical opening in said bearing to retain said bearing in mating engagement with said washer.

4. The assembly as in claim 2 wherein said bearing is fabricated from a polytetrafluoroethylene polymer.

5. The assembly as in claim 1 wherein said washer and shank are fabricated from a urethane polymer.

6. The assembly as in claim 1 including a resilient expander plug disposed between the legs of said shank to provide additional rigidity thereto.

7. The assembly as in Claim 1 wherein the cross sectional area of said legs of said shank in the form of ring sections being of greater are than the ring section area of said slot bifurcating said legs.

* * * * *